Figure 1:
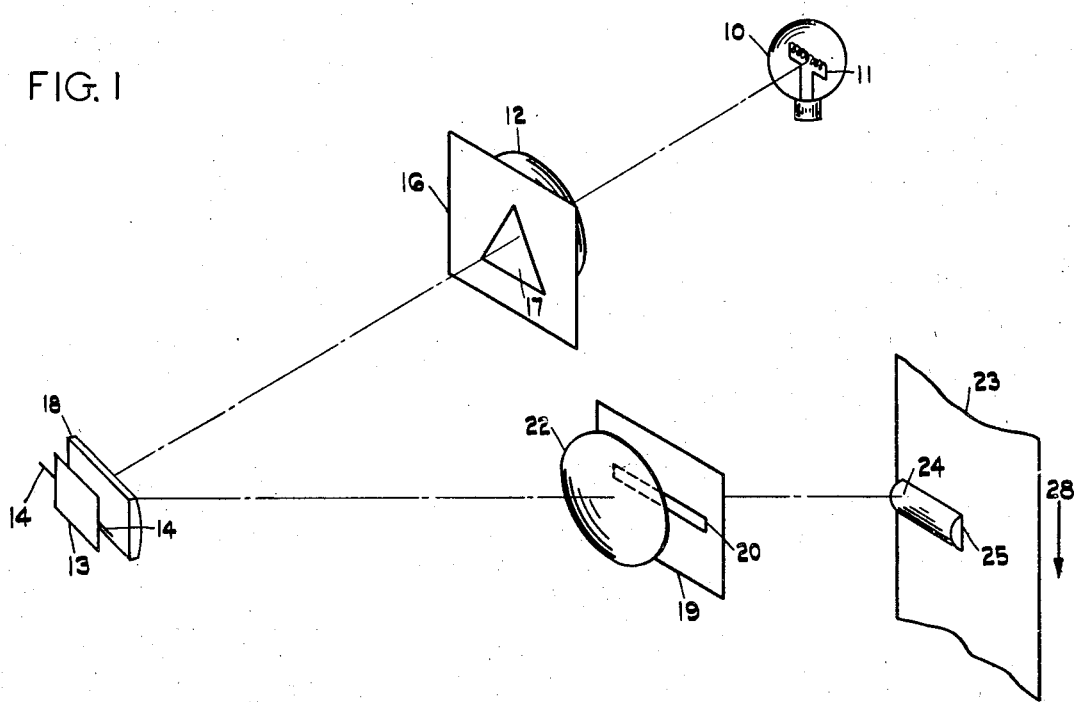

2,331,036

Filed July 2, 1940    2 Sheets-Sheet 1

INVENTOR
JOHN A. MAURER, JR.
BY Otto J. Nathansohn
AGENT

Oct. 5, 1943.  J. A. MAURER, JR  2,331,036
OPTICAL SYSTEM
Filed July 2, 1940   2 Sheets-Sheet 2

INVENTOR
JOHN A. MAURER, JR.

BY Otto J. Nathansohn

AGENT

Patented Oct. 5, 1943

2,331,036

UNITED STATES PATENT OFFICE 2,331,036

OPTICAL SYSTEM

John A. Maurer, Jr., New York, N. Y., assignor, by mesne assignments, to J. A. Maurer, Inc., a corporation of New York Application July 2, 1940, Serial No. 343,616

19 Claims. (Cl. 88—24)

This invention relates to optical systems for the photographic recording of electrical impulses on a moving film such as are used in sound recording, picture transmission, and the like. More particularly, it relates to optical systems of this class which produce impulse records of constant width but varying intensity. Such records are known as variable density records.

The optical systems for variable density recording used in present-day practice commonly employ either a glow lamp, or a string oscillograph or light valve. These devices for translating electrical impulses into vibrations of a beam of light have certain inherent drawbacks which are generally known and hence need not be stated here in detail. It has therefore been proposed to employ, for variable density recording, optical systems having a mirror oscillograph or similar translating device, and it is an object of the invention to provide an improved optical system of this type.

Another object of the invention is the provision of an optical system of this type which is particularly satisfactory as regards efficiency of illumination, convenience of adjustment, and ease of manufacture.

Another object of the invention is the provision of an optical system of this type by means of which a linear relation between the electrical impulses to be recorded and the transparency of the record used for their reproduction may easily be effected.

Another object of the invention is the provision of an optical system of this type which may be built with small physical size and at comparatively little cost.

Another object of the invention is the provision, in such an optical system, of means by which a re-imagery of the recording light source on the film may be positively excluded.

Another object of the invention is the provision, in such an optical system, of means for producing a light spot of graded illumination which are easy and inexpensive to manufacture, and which are generally more satisfactory than similar means known heretofore.

Still other objects and advantages of the invention include those which are hereinafter stated or apparent, or which are incidental to the invention.

The objects of the invention are substantially achieved by providing an optical system having means for producing a line of light extending in a direction at right angles to the direction in which the film moves at the recording point, that is, the point at which the optical axis of the system strikes the film. The optical system furthermore has means for varying the illumination of said line of light in accordance with the electrical impulses to be recorded, and finally means imaging said line of light and acting only in a plane which is at right angles thereto and extends through the recording point. By the cooperation of these three means, there is produced at the recording point a final line image the intensity of which varies in accordance with the electrical impulses to be recorded.

Throughout the present specification, the direction in which the film moves at the recording point, and the directions parallel to it, will be called vertical, and the direction in which the line of light of varying illumination extends, and the directions parallel to it, will be called horizontal, the horizontal directions being at right angles to the vertical directions. Moreover, the plane in which the means imaging the line of light act will be called the vertical plane, and the plane which contains the line of light, and which is at right angles to the vertical direction, will be called the horizontal plane, the horizontal plane being at right angles to the vertical plane.

It will thus be seen that in the present specification the terms "vertical" and "horizontal" will not be used in any absolute sense but merely as indicating relative position or direction, and that choice between these terms has been determined merely by convenience in description and illustration.

The invention also provides means for varying the illumination of the aforementioned line of light, which means include a slit which extends horizontally, means for forming a uniformly illuminated light spot the horizontal extension of which gradually varies in a vertical direction, and means acting in the vertical plane only for forming an image of this light spot in the plane of the slit. By the cooperation of the two last mentioned means there is formed in the plane of the slit a light spot whose illumination gradually varies in a vertical direction.

The invention will be better understood when the following description is considered with the accompanying drawings of certain presently preferred embodiments thereof, and its scope will be pointed out in the appended claims.

Figure 2:
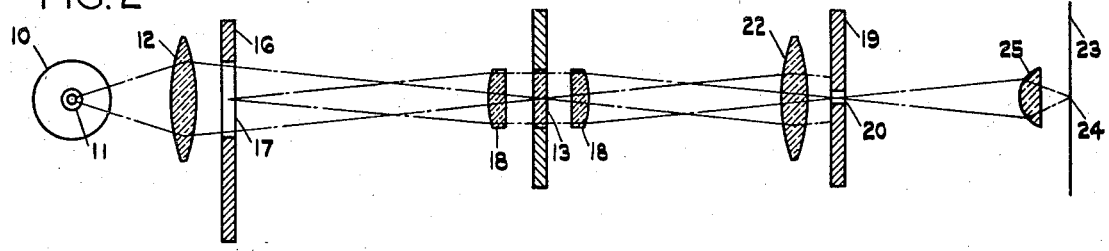
Figure 3:
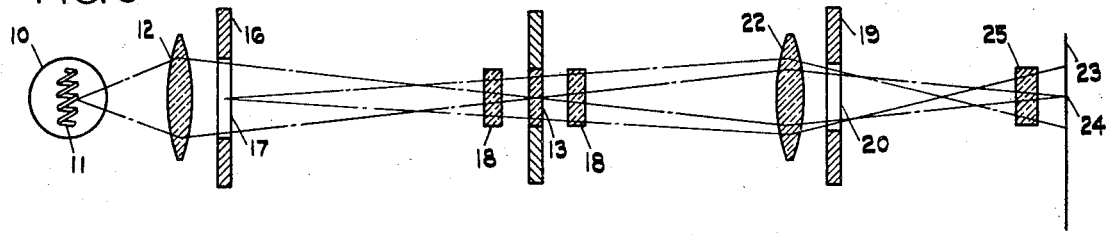
Figure 4:
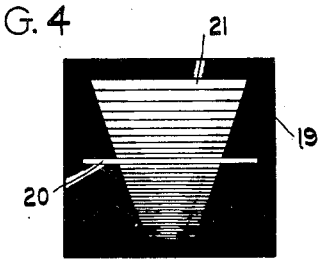
Figure 8:
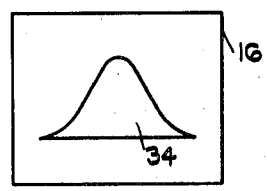
Figure 9:
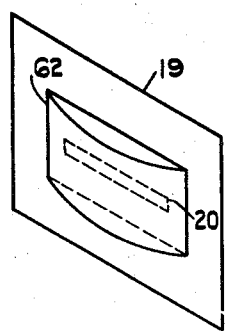
Figure 10:
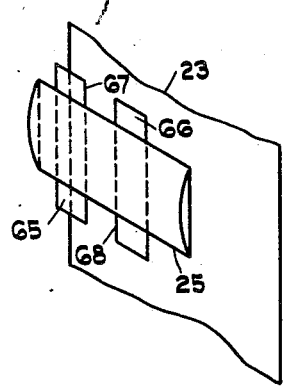
Figure 11:
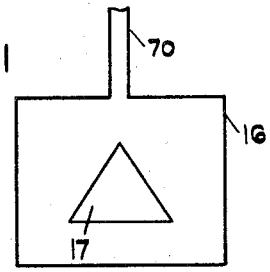

In the drawings:

Fig. 1 is a diagrammatic perspective view of one embodiment of the invention,

Fig. 2 is a diagrammatic longitudinal section in the vertical plane of the optical system shown in Fig. 1, the optical axis being represented as a straight line and an oscillograph mirror being represented as an aperture, Fig. 3 is a corresponding section in the horizontal plane, Fig. 4 is an elevation of one element shown in Fig 1 and of the light spot of graded illumination produced thereon, Figs. 5 to 8 show in elevation modifications of an element shown in Fig. 1, Fig. 9 is a perspective view of a modification of another element shown in Fig. 1, Fig. 10 is a perspective view of another modification of the optical system shown in Figs. 1 to 3, and Fig. 11 shows an adaptation to a particular purpose of the element shown in Figs. 1 and 5 to 8.

Throughout the drawings, identical parts are designated by identical reference characters.

Referring first to Figs. 1 to 4, there is shown a recording light source such as an incandescent lamp 10. The filament 11 of lamp 10 is focused by a suitable condenser lens 12, preferably of wide aperture, on the mirror 13 of an oscillograph galvanometer (not shown) or similar device translating electrical impulses into mechanical vibrations. The axis 14—14 about which mirror 13 is mounted to vibrate extends horizontally.

A screen 16 is placed adjacent to lens 12. Screen 16 has an opening 17 which is an isosceles triangle with its base extending horizontally. Opening 17 is imaged by means of a cylindrical lens 18, placed in front of mirror 13, on a screen 19 in which a slit 20 extends horizontally. Cylindrical lens 18 has its cylinder axis horizontal and hence acts in the vertical plane only (see Figs. 2 and 3).

The effect of this arrangement on the light flux proceeding through the optical system may be explained as follows:

Opening 17, which is uniformly illuminated by lamp filament 11, may be considered as being a light spot whose horizontal extension gradually varies in a vertical direction, and which hence is composed of an infinite number of horizontal levels of light. These horizontal levels may be considered as being equal in vertical extension or height, but gradually varying in horizontal extension or length, while their illumination is uniform.

As cylindrical lens 18 does not act in the horizontal plane, the light fluxes emanating from the individual horizontal levels of varying lengths diverge in the horizontal plane. As, on the other hand, cylindrical lens 18, by its action in the vertical plane, focuses these light fluxes on screen 19, their divergence is restricted to a horizontal direction. As furthermore the angle of divergence is about equal for all the levels, the light flux contained in the horizontal levels of varying lengths arrives at screen 19 spread out horizontally over about equal lengths, and as finally the shorter levels contain a smaller amount of light than the longer ones—the illumination of opening 17 being uniform—there is formed for each horizontal level of opening 17 a corresponding horizontal level on screen 19, the levels on screen 19 which correspond to the shorter levels of opening 17 having less illumination than those which correspond to the longer levels of opening 17. Thus, a light spot 21 whose illumination gradually varies in a vertical direction is formed in the plane of slit 20, which plane is at right angles to both the vertical and horizontal planes and contains slit 20 (see Fig. 4).

In any practical embodiment of the present invention, however, mirror 13 is of small size and hence forms, according to the well known action of small apertures, a rather blurred and indistinct image of opening 17 on screen 19. Because of this aperture effect of mirror 13, the individual levels of light spot 21 vary somewhat in length, and the amount of light contained in each of these levels is not evenly distributed over its length. Light spot 21 therefore approximately has the appearance given to it in Fig. 4, and a portion of it illuminates slit 20 as shown.

But notwithstanding its uneven distribution as regards length and intensity the amount of light contained in each level of light spot 21 is the same as was contained in the corresponding level of opening 17. The gradual variation in light flux of the individual levels of light spot 21 is therefore directly and linearly proportional to the gradual variation in length of the levels of opening 17.

When now the electrical impulses to be recorded are applied in known manner to the oscillograph galvanometer on which mirror 13 is mounted, mirror 13, vibrating in accordance therewith, moves light spot 21 vertically, that is, across slit 20. This vibration of light spot 21 across slit 20 results in variations of the illumination of slit 20. In other words, there appears at slit 20 a line of light whose illumination varies in accordance with the electrical impulses to be recorded.

A spherical lens 22, preferably of wide aperture, is placed adjacent to screen 19. Lens 22 produces on, or in the neighborhood of, film 23, that is, approximately at the recording point 24, an image of mirror 13, light from lamp filament 11 being directed upon mirror 13 by condenser lens 12. To throw the image of mirror 13 slightly out of focus with respect to film 23 has the advantage that the ordinarily coiled structure of lamp filament 11, which is reproduced on mirror 13, is not re-imaged on film 23 where it would cause striations of a generally undesirable character.

In the vertical plane, the action of spherical lens 22 is barred by screen 19 (see Fig. 2). But by its action in the horizontal plane lens 22 produces, at the recording point 24, an even distribution of whatever part of the light flux in light spot 21 is permitted to pass slit 20. As has been explained hereinabove in connection with the formation of light spot 21, this part of the light flux is unevenly distributed horizontally over a varying length as it passes through slit 20. But its even distribution at the recording point 24 takes place over a constant length, namely, within approximately the horizontal extension, or length, of the image of mirror 13 produced by lens 22 (see Fig. 3), which image length should therefore be at least equal to the horizontal extension, or width, of the impulse record desired. Thus, by its action in the horizontal plane lens 22 concentrates at the recording point 24 the light flux passing through slit 20.

As the focal length of spherical lens 22, in order to form an image of mirror 13 approximately at the recording point 24, must be large compared to its distance from screen 19, lens 22 does not interfere with the imagery, by cylindrical lens 18, of opening 17 in the plane of slit 20.

Between screen 19 and film 23 there is placed a cylindrical lens 25, which has its cylinder axis horizontal and therefore does not act in the horizontal plane. In the vertical plane, however, cylindrical lens 25 forms on film 23 at the recording point 24 an image of slit 20, that is, of the line of light appearing at slit 20. By virtue of this action of cylindrical lens 25, the part of the light flux which passes through slit 20 appears on film 23 at the recording point 24 as a final image, the horizontal extension or length of which is determined by the length of the image of mirror 13 formed by spherical lens 22 (see Figs. 2 and 3). As long as some part of light spot 21 remains over slit 20, this image length remains constant no matter into what position mirror 13 is deflected, and for that reason the length of the final line image remains constant regardless of which portion of light spot 21 is caused by the deflection of mirror 13 to illuminate slit 20.

When therefore the illumination of the line of light appearing at slit 20 varies on account of the deflection of mirror 13 in accordance with the electrical impulses to be recorded, these variations of the amount of the light flux permitted to pass through slit 20 become manifest as variations of the intensity of the final line image. As the vertical extension or width of the final line image is determined by the action of cylindrical lens 25 in the vertical plane, it will now be understood why it is immaterial that the action of spherical lens 22 in the vertical plane is barred by screen 19. No harm, however, will result if, in embodiments of the invention other than those shown and described in the present specification, spherical lens 22 should image mirror 13 by acting in the vertical plane also.

Thus, a variable density record is produced on film 23 when it moves past the recording point 24 in a substantially vertical direction, as indicated by the arrow 28.

Figure 5:
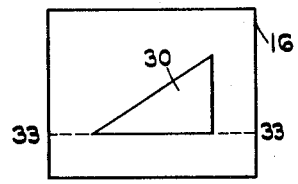

The optical system shown in Figs. 1 to 4 and described hereinabove may be modified as follows:

(1) Opening 17 in screen 16 is shown in Fig. 1 as being an isosceles triangle. Screen 16 may, however, have any other opening whose horizontal extension gradually varies in a vertical direction, such an opening having at least one edge which is inclined with respect to the horizontal plane of the optical system. The opening in screen 16 may, for example, be a right-angled triangle 30 with one of the sides adjacent to the right angle extending horizontally, as shown in Fig. 5, or there may be one or more saw-tooth projections extending into it as they do into openings 31 and 32 in Figs. 6 and 7. But with any of these openings there is produced in the plane of slit 20 a light spot whose illumination gradually varies in a vertical direction, because cylindrical lens 18 does not act in the horizontal plane.

The gradual variation of the illumination of the light spot formed in the plane of slit 20 depends only upon the gradual variation of the lengths of the horizontal levels constituting the opening in screen 16 as produced by the inclined edge or edges of said opening. The lower portion of screen 16 may therefore be omitted if desired, as indicated by way of example by the broken line 33—33 in Fig. 5.

In order to effect a linear relation between the electrical impulses to be recorded and the transparency of the record used for their reproduction, the horizontal extension of the opening in screen 16 may gradually vary in a non-linear manner. To that end, one or more of its inclined edges may be curved as are the two inclined edges of opening 34 shown in Fig. 8, a method of computing a suitable curve being disclosed, for example, in British specification 424,042 (I. G. Farbenindustrie). Thus, distortions may be canceled which are introduced, for example, by the non-linear characteristics of the oscillograph galvanometer on which mirror 13 is mounted, or the emulsions of the recording and printing films, or both.

(2) While cylindrical lens 18 is shown as being placed in front of mirror 13 so as to act on the light flux proceeding through the optical system both before and after it is reflected from mirror 13, it may also be placed so that it acts on only the incident or only the reflected light flux.

(3) Slit 20 may be replaced by a cylindrical lens which acts in the vertical plane only, as is set forth in detail in my co-pending application Serial No. 343,617, filed on the same day and assigned to the same assignee as the present application, now Patent No. 2,299,024, issued Oct. 13, 1942.

(4) It has been pointed out hereinabove that it is immaterial that the action of spherical lens 22 in the vertical plane is barred by screen 19. Hence, there may be used in place of spherical lens 22 a cylindrical lens 62 with its cylinder axis vertical, as shown in Fig. 9, lens 62 having the same focal length and aperture as lens 22 but acting in the horizontal plane only.

Furthermore, while spherical lens 22 and cylindrical lens 62 are shown in Figs. 1 to 3 and 9 as being placed between mirror 13 and screen 19, they may also be placed between screen 19 and cylindrical lens 25.

In case spherical lens 22 and cylindrical lens 62 are placed between screen 19 and cylindrical lens 25, and in case cylindrical lens 62 is placed between mirror 13 and screen 19, these lenses may have any position which is consistent with their function to image, by their action in the horizontal plane, mirror 13 approximately at the recording point 24. If, however, spherical lens 22 is placed between mirror 13 and screen 19, its position should preferably be in the immediate vicinity of screen 19, as shown in the drawings, so that it does not interfere, by its action in the vertical plane, with the imagery of the opening in screen 16 by cylindrical lens 18.

(5) The final line image of constant length and varying intensity which is produced by the cooperation of cylindrical lens 25 and spherical lens 22, or cylindrical lens 25 and cylindrical lens 62, has been shown and described hereinabove as being formed immediately on film 23. It may, however, also be re-imaged on film 23 by suitable means inserted at a convenient place between cylindrical lens 25 and film 23.

This re-imagery may be effected by means acting in both the vertical and horizontal planes and either with or without changing, in either one plane or in the two planes, the dimensions of the final line image. It may also be effected by means acting in the vertical plane only, for example, by inserting between cylindrical lens 25 and film 23 a cylindrical lens with its cylinder axis horizontal, concentrating lenses 22 or 62 in this case imaging mirror 13 through the two cylindrical lenses approximately at the recording point 24.

(6) It has been assumed hereinbefore that the final line image formed at the recording point 24 is of uniform illumination throughout its entire length. Actually, this is true only in case the image of mirror 13 formed by concentrating lenses 22 or 62 is in focus at the recording point 24. If it is out of focus with respect thereto the illumination of the final line image decreases at its ends, and only its central portion is uniformly illuminated. The edges of the impulse record are therefore blurred in this case and should be screened off when prints of the record are made, such screening off now being commonly practiced in printing from variable density records.

If, however, it is desired to eliminate the blurred edges when making the original record on film 23, two screens 65 and 66 or like means having vertical edges 67 and 68 may be employed, edges 67 and 68 being spaced apart so as to confine between themselves the uniformly illuminated central portion of the final line image. Screens 65 and 66 may be placed between cylindrical lens 25 and film 23, as shown in Fig. 10, or in front of lamp 10 or mirror 13.

(7) The optical system disclosed in the present specification is characterized by the fact that in its final stage there is employed a lens 25 acting in the vertical plane only and imaging at the recording point 24 a slit which extends horizontally and whose illumination gradually varies in accordance with the electrical impulses to be recorded. Lens 25 therefore has to be cylindrical, and the required employment of a cylindrical lens in the final stage of the optical system has inherent advantages: Such a lens may have a short focal length, which permits of building the optical system with small physical size, and a cylindrical lens of short focal length is less expensive than a spherical lens system well enough corrected to be capable of forming, over the same length, an equally sharp line image. The optical system may therefore be built at comparatively little cost.

The employment of a cylindrical lens in the final stage of the optical system, however, does not depend upon the particular method for varying the illumination of the slit disclosed in the present specification. Hence, the important advantages connected therewith may be enjoyed in other optical systems for variable density recording in which a gradual variation of the illumination of a horizontally extending slit is accomplished by the vibration across said slit, of a light spot whose illumination gradually varies in a vertical direction.

An optical system of this kind is disclosed, for example, in G. L. Dimmick's U. S. specifications 2,095,317 and 2,095,318, in which it has been proposed to form in the plane of a horizontal slit a penumbra whose graduation progresses vertically, and to image said slit by a spherical lens system in both the vertical and horizontal planes. This spherical lens system may be replaced by a cylindrical lens acting in the vertical plane only so as to obtain the beneficial results accruing from the employment of such a lens, provided that the oscillographic mirror employed for vibrating the penumbra across the slit is imaged approximately at the recording point by means acting in the horizontal plane.

(8) Normally, the optical system disclosed in the present specification is so adjusted that in the rest or zero position of mirror 13, that is, when no electrical impulses are applied to the oscillograph galvanometer on which it is mounted, slit 20 is illuminated by a horizontal level of light spot 21 which has about half the illumination present in the brightest of those levels. If, however, sound is to be recorded by the method generally known as "noiseless recording," mirror 13 may be biased in the manner disclosed in L. T. Robinson's U. S. specification 1,854,159.

Alternatively, screen 16 may be vibrated vertically. To that end, it may be connected by a stem 70, shown by way of example in Fig. 11, or like means to a motor to which an electric current corresponding to the envelope of the sound waves to be recorded is applied. Such a motor and a method for its operation is disclosed, for example, in H. McDowell, Jr.'s, U. S. specification 1,855,197.

Figure 6:
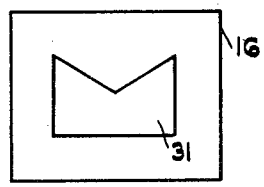
Figure 7:
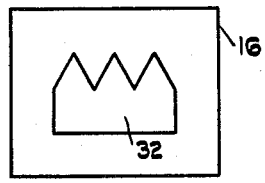

Finally, when screen 16 has the opening 17 shown in Fig. 1, the opening 31 shown in Fig. 6, the opening 34 shown in Fig. 8, or a similar opening, noiseless recording may also be achieved by providing adjacent to screen 16 a twin shutter mechanism similar to that disclosed in H. J. Hasbrouck's U. S. specification 2,102,778.

The application of any of the methods for noiseless recording mentioned above will result in shifting the mean density of the sound record produced on film 23 in accordance with the envelope of the sound waves to be recorded.

(9) The optical system disclosed in the present specification differs from the optical system disclosed in Figs. 1 to 7 of my co-pending application Serial No. 343,615, filed on the same day and assigned to the same assignee as the present specification, merely in that the opening in screen 16 is imaged in the plane of slit 20 by means acting in the vertical plane only instead of by means acting in both the vertical and horizontal planes. The same final result, that is, a variable density record, may therefore be accomplished by employing, for the imagery of the opening in screen 16, either a spherical lens or a cylindrical lens with its cylinder axis horizontal. This interchangeability of the means imaging the opening in screen 16 in the plane of slit 20 affords an advantageous degree of freedom in designing a particular optical system in accordance with the inventions disclosed in the present specification and the co-pending application referred to above.

Furthermore, the optical system disclosed in the present specification and the two optical systems disclosed in Figs. 1 to 7 and 8 to 10 of my application Serial No. 343,615 have the common advantage that their adjustment is not critical in that the image of the opening in screen 16 need be formed only approximately in the plane of slit 20, that is, either exactly in this plane or in the neighborhood thereof.

Provided, however, that the image of mirror 13 formed by concentrating lenses 22 or 62 is out of focus with respect to the recording point 24, the optical system disclosed in the present specification has the specific advantage that re-imagery of the structure of lamp filament 11 on film 23 is excluded for any working position of mirror 13. That is to say, such exclusion takes place even when mirror 13 is deflected into a position in which slit 20 is illuminated by the light flux contained in the tip or tips of the openings shown in Figs. 1 and 5 to 8 of the present specification and in Figs. 1 and 4 to 7 of my application Serial No. 343,615, or of similar openings whose shapes are derived from a triangle. If mirror 13 assumes this position in the case disclosed in my application Serial No. 343,615, in which the respective openings are imaged by means acting in both the vertical and horizontal planes, the tip or tips of the respective uniformly illuminated light spots produced in the plane of slit 20 form, according to the action of small apertures referred to hereinabove, an image of lamp filament 11 on film 23.

On the other hand, in the case disclosed in the present specification, in which the respective openings are imaged by means acting in the vertical plane only, the light flux contained in the respective tips is spread out horizontally over a certain length at slit 20, and thus the formation of what amounts to a small aperture is avoided at this point of the optical system.

Many other modifications of the invention will readily suggest themselves to those skilled in the art. The invention, therefore, is not to be limited, except in so far as is necessitated by the prior art and by the spirit of the appended claims.

What is claimed is:

1. An optical system of the class described having, in combination, means forming a slit which extends horizontally; means for forming a light spot of vertically varying illumination in the plane of said slit, said last mentioned means including means for forming a uniformly illuminated light spot the horizontal extension of which varies in a vertical direction, and imaging means acting in the vertical plane only as the sole means for forming an image of said uniformly illuminated light spot in the plane of said slit; and means for vibrating said light spot of vertically varying illumination across said slit.

2. An optical system as defined in claim 1 wherein said vibrating means are adapted to vibrate said light spot of vertically varying illumination in accordance with electrical impulses to be recorded, and the horizontal extension of said uniformly illuminated light spot varies vertically in such a manner as to effect a linear relation between said electrical impulses and the transparency of the record used for the reproduction thereof.

3. An optical system of the class described having, in combination, means forming a slit which extends horizontally; means for forming a light spot of vertically varying illumination in the plane of said slit, said last mentioned means including a screen with an opening the horizontal extension of which varies in a vertical direction, means for uniformly illuminating said opening, and imaging means acting in the vertical plane only as the sole means for forming an image of said opening in the plane of said slit; and means for vibrating said light spot of vertically varying illumination across said slit.

4. An optical system as defined in claim 3 wherein said vibrating means are adapted to vibrate said light spot of vertically varying illumination in accordance with electrical impulses, and said screen is vertically movable in accordance with the envelope of said electrical impulses.

5. An optical system of the class described for use with a film which moves at the recording point in a substantially vertical direction, having, in combination, means forming a slit which extends horizontally; means for forming a light spot of vertically varying illumination in the plane of said slit, said last mentioned means including a screen with an opening the horizontal extension of which varies in a vertical direction, means for uniformly illuminating said opening, and imaging means acting in the vertical plane only as the sole means for forming an image of said opening in the plane of said slit; a mirror adapted to vibrate about a horizontal axis so as to move said light spot of vertically varying illumination across said slit; means acting in the vertical plane only as the sole means for imaging said slit at said recording point; and means imaging said mirror approximately at said recording point and acting in the horizontal plane.

6. An optical system of the class described for use with a film which moves at the recording point in a substantially vertical direction, having, in combination, a light source; a mirror adapted to vibrate about a horizontal axis; means for directing light from said light source upon said mirror; means placed between said mirror and said film and forming a slit which extends horizontally; means for forming a light spot of vertically varying illumination in the plane of said slit, said last mentioned means including a screen placed between said light source and said mirror and having an opening the horizontal extension of which varies in a vertical direction, said opening being uniformly illuminated by said light source, and imaging means acting in the vertical plane only as the sole means for forming an image of said opening in the plane of said slit, said image being movable by the vibration of said mirror; means acting in the vertical plane only as the sole means for imaging said slit at said recording point; and means imaging said mirror approximately at said recording point and acting in the horizontal plane.

7. An optical system of the class described having, in combination, means forming a slit which extends horizontally; means for forming a light spot of vertically varying illumination in the plane of said slit, said last mentioned means including means for forming a uniformly illuminated light spot which has the shape of an isosceles triangle with its base extending horizontally, and imaging means acting in the vertical plane only as the sole means for forming an image of said uniformly illuminated light spot in the plane of said slit; and means for vibrating said light spot of vertically varying illumination across said slit.

8. An optical system as defined in claim 7 wherein said vibrating means are adapted to vibrate said light spot of vertically varying illumination in accordance with electrical impulses to be recorded, and one of the two inclined sides of said isosceles triangle is curved so as to effect a linear relation between said electrical impulses and the transparency of the record used for the reproduction thereof.

9. An optical system as defined in claim 7 wherein said vibrating means are adapted to vibrate said light spot of vertically varying illumination in accordance with electrical impulses to be recorded, and the two inclined sides of said isosceles triangle are curved so as to effect a linear relation between said electrical impulses and the transparency of the record used for the reproduction thereof.

10. An optical system of the class described having, in combination, means forming a slit which extends horizontally; means for forming a light spot of vertically varying illumination in the plane of said slit, said last mentioned means including a screen with an opening which is an isosceles triangle with its base extending horizontally, means for uniformly illuminating said opening, and imaging means acting in the vertical plane only as the sole means for forming an image of said opening in the plane of said slit; and means for vibrating said light spot of vertically varying illumination across said slit.

11. An optical system as defined in claim 10 wherein said vibrating means are adapted to vibrate said light spot of vertically varying illumination in accordance with electrical impulses, and said screen is vertically movable in accordance with the envelope of said electrical impulses.

12. An optical system of the class described for use with a film which moves at the recording point in a substantially vertical direction, having, in combination, means forming a slit which extends horizontally; means for forming a light spot of vertically varying illumination in the plane of said slit, said last mentioned means including a screen with an opening which is an isosceles triangle with its base extending horizontally, means for uniformly illuminating said opening, and imaging means acting in the vertical plane only as the sole means for forming an image of said opening in the plane of said slit; a mirror adapted to vibrate about a horizontal axis so as to move said light spot of vertically varying illumination across said slit; means acting in the vertical plane only as the sole means for imaging said slit at said recording point; and means imaging said mirror approximately at said recording point and acting in the horizontal plane.

13. An optical system of the class described for use with a film which moves at the recording point in a substantially vertical direction, having, in combination a light source; a mirror adapted to vibrate about a horizontal axis; means for directing light from said light source upon said mirror; means placed between said mirror and said film and forming a slit which extends horizontally; means for forming a light spot of vertically varying illumination in the plane of said slit, said last mentioned means including a screen placed between said light source and said mirror and having an opening which is an isosceles triangle with its base extending horizontally, said opening being uniformly illuminated by said light source, and imaging means acting in the vertical plane only as the sole means for forming an image of said opening in the plane of said slit, said image being movable by the vibration of said mirror; means acting in the vertical plane only as the sole means for imaging said slit at said recording point; and means imaging said mirror approximately at said recording point and acting in the horizontal plane.

14. An optical system of the class described having, in combination, means forming a slit which extends horizontally; means for forming a light spot of vertically varying illumination in the plane of said slit, said last mentioned means including means for forming a uniformly illuminated light spot which has the shape of a right-angled triangle with one of the sides adjacent to the right angle extending horizontally, and imaging means acting in the vertical plane only as the sole means for forming an image of said uniformly illuminated light spot in the plane of said slit; and means for vibrating said light spot of vertically varying illumination across said slit.

15. An optical system as defined in claim 14 wherein said vibrating means are adapted to vibrate said light spot of vertically varying illumination in accordance with electrical impulses to be recorded, and the inclined side of said right-angled triangle is curved so as to effect a linear relation between said electrical impulses and the transparency of the record used for the reproduction thereof.

16. An optical system of the class described having, in combination, means forming a slit which extends horizontally; means for forming a light spot of vertically varying illumination in the plane of said slit, said last mentioned means including a screen with an opening which is a right-angled triangle with one of the sides adjacent to the right angle extending horizontally, means for uniformly illuminating said opening, and imaging means acting in the vertical plane only as the sole means for forming an image of said opening in the plane of said slit; and means for vibrating said light spot of vertically varying illumination across said slit.

17. An optical system as defined in claim 16 wherein said vibrating means are adapted to vibrate said light spot of vertically varying illumination in accordance with electrical impulses, and said screen is vertically movable in accordance with the envelope of said electrical impulses.

18. An optical system of the class described for use with a film which moves at the recording point in a substantially vertical direction, having, in combination, means forming a slit which extends horizontally; means for forming a light spot of vertically varying illumination in the plane of said slit, said last mentioned means including a screen with an opening which is a right-angled triangle with one of the sides adjacent to the right angle extending horizontally, means for uniformly illuminating said opening, and imaging means acting in the vertical plane only as the sole means for forming an image of said opening in the plane of said slit; a mirror adapted to vibrate about a horizontal axis so as to move said light spot of vertically varying illumination across said slit; means acting in the vertical plane only as the sole means for imaging said slit at said recording point; and means imaging said mirror approximately at said recording point and acting in the horizontal plane.

19. An optical system of the class described for use with a film which moves at the recording point in a substantially vertical direction, having, in combination, a light source; a mirror adapted to vibrate about a horizontal axis; means for directing light from said light source upon said mirror; means placed between said mirror and said film and forming a slit which extends horizontally; means for forming a light spot of vertically varying illumination in the plane of said slit, said last mentioned means including a screen placed between said light source and said mirror and having an opening which is a right-angled triangle with one of the sides adjacent to the right angle extending horizontally, said opening being uniformly illuminated by said light source, and imaging means acting in the vertical plane only as the sole means for forming an image of said opening in the plane of said slit, said image being movable by the vibration of said mirror; means acting in the vertical plane only as the sole means for imaging said slit at said recording point; and means imaging said mirror approximately at said recording point and acting in the horizontal plane.

JOHN A. MAURER, Jr.